(12) United States Patent
Nelson et al.

(10) Patent No.: US 9,920,610 B2
(45) Date of Patent: Mar. 20, 2018

(54) METHOD OF USING DIVERTER AND PROPPANT MIXTURE

(71) Applicant: Baker Hughes, a GE company, LLC, Houston, TX (US)

(72) Inventors: Scott G. Nelson, Cypress, TX (US); Harold Dean Brannon, Magnolia, TX (US); Jimie DeVon Lemons, Houston, TX (US); Thomas Ray Starks, II, Spring, TX (US); D. V. Satyanarayana Gupta, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 14/512,232

(22) Filed: Oct. 10, 2014

(65) Prior Publication Data

US 2015/0041132 A1 Feb. 12, 2015

Related U.S. Application Data

(63) Continuation-in-part of application No. 14/461,123, filed on Aug. 15, 2014, which is a (Continued)

(51) Int. Cl.
    *E21B 43/267* (2006.01)
    *E21B 43/14* (2006.01)
    (Continued)

(52) U.S. Cl.
    CPC ............ *E21B 43/267* (2013.01); *C09K 8/508* (2013.01); *C09K 8/516* (2013.01); *C09K 8/68* (2013.01);
    (Continued)

(58) Field of Classification Search
    CPC ... C09K 8/74; C09K 8/68; C09K 8/72; C09K 8/506; C09K 8/50; C09K 8/76;
    (Continued)

(56) References Cited

U.S. PATENT DOCUMENTS 2,596,843 A 5/1952 Farris
2,735,269 A 2/1956 Carpenter et al.
(Continued)

FOREIGN PATENT DOCUMENTS

CA 2329834 A1 6/2002
EP 0308257 A2 3/1989
(Continued)

OTHER PUBLICATIONS

Chellappah "A new outlook on the idea I packing Theory for Bridging Solids" SPE 151636 Feb. 17, 2012.*
(Continued)

*Primary Examiner* — William D Hutton, Jr.
*Assistant Examiner* — Charles R Nold
(74) *Attorney, Agent, or Firm* — John Wilson Jones; Jones Delflache LLP

(57) ABSTRACT

The flow of well treatment fluids may be diverted from a high permeability zone to a low permeability zone within a fracture network within a subterranean formation by use of a mixture comprising a dissolvable diverter and a proppant. At least a portion of the high permeability zone is propped open with the proppant of the mixture and at least a portion of the high permeability zone is blocked with the diverter. A fluid is then pumped into the subterranean formation and into a lower permeability zone of the formation farther from the wellbore. The diverter in the high permeability zones may then be dissolved at in-situ reservoir conditions and hydrocarbons produced from the high permeability propped zones of the fracture network. The mixture has particular
(Continued)

applicability in the enhancement of production or hydrocarbons from high permeability zones in a fracture network located near the wellbore.

20 Claims, 3 Drawing Sheets

Related U.S. Application Data continuation-in-part of application No. 13/928,006, filed on Jun. 26, 2013.

(60) Provisional application No. 61/664,640, filed on Jun. 26, 2012.

(51) Int. Cl.

| | | |
|---|---|---|
| *C09K 8/516* | (2006.01) | |
| *C09K 8/508* | (2006.01) | |
| *E21B 33/138* | (2006.01) | |
| *C09K 8/536* | (2006.01) | |
| *E21B 43/26* | (2006.01) | |
| *C09K 8/68* | (2006.01) | |
| *C09K 8/72* | (2006.01) | |
| *C09K 8/76* | (2006.01) | |
| *C09K 8/88* | (2006.01) | |
| *C09K 8/70* | (2006.01) | |
| *C09K 8/92* | (2006.01) | |

(52) U.S. Cl.
CPC ............... *C09K 8/70* (2013.01); *C09K 8/725* (2013.01); *C09K 8/76* (2013.01); *C09K 8/88* (2013.01); *C09K 8/92* (2013.01); *E21B 33/138* (2013.01); *E21B 43/14* (2013.01); *E21B 43/261* (2013.01); *C09K 2208/18* (2013.01)

(58) Field of Classification Search
CPC .... C09K 8/035; C09K 2208/18; C09K 8/508; C09K 8/689; E21B 33/138; E21B 43/26; E21B 43/261; E21B 33/13; E21B 43/04; E21B 21/003; E21B 33/12
See application file for complete search history.

(56) References Cited

U.S. PATENT DOCUMENTS

| | | |
|---|---|---|
| 2,966,457 A | 12/1960 | Starmann et al. |
| 3,089,542 A | 5/1963 | Kolodny |
| 3,127,937 A | 4/1964 | McGuire, Jr. et al. |
| 3,149,673 A | 9/1964 | Pennington |
| 3,149,674 A | 9/1964 | Schultze et al. |
| 3,151,678 A | 10/1964 | Hanson et al. |
| 3,159,217 A | 12/1964 | Hanson |
| 3,175,615 A | 3/1965 | East |
| 3,254,717 A | 6/1966 | Huitt et al. |
| 3,266,573 A | 8/1966 | Rixe |
| 3,335,796 A | 8/1967 | Parker, Jr. |
| 3,335,797 A | 8/1967 | Braunlich, Jr. |
| 3,372,752 A | 3/1968 | Prater |
| 3,399,727 A | 9/1968 | Graham et al. |
| 3,480,084 A | 11/1969 | Eilers |
| 3,492,147 A | 1/1970 | Young et al. |
| 3,497,008 A | 2/1970 | Graham et al. |
| 3,659,651 A | 5/1972 | Graham |
| 3,709,300 A | 1/1973 | Pye |
| 3,888,311 A | 6/1975 | Cooke, Jr. |
| 3,929,191 A | 12/1975 | Graham et al. |
| 3,937,283 A | 2/1976 | Blauer et al. |
| 3,954,142 A | 5/1976 | Broaddus et al. |
| 4,051,900 A | 10/1977 | Hankins |
| 4,074,760 A | 2/1978 | Copeland et al. |
| 4,078,609 A | 3/1978 | Pavlich |
| 4,078,610 A | 3/1978 | Arnold |
| 4,195,010 A | 3/1980 | McClinton et al. |
| 4,216,829 A | 8/1980 | Murphey |
| 4,421,167 A | 12/1983 | Erbstoesser et al. |
| 4,439,489 A | 3/1984 | Johnson et al. |
| 4,444,264 A | 4/1984 | Dill |
| 4,462,466 A | 7/1984 | Kachnik |
| 4,493,875 A | 1/1985 | Beck |
| 4,502,967 A | 3/1985 | Conway |
| 4,506,734 A | 3/1985 | Nolte |
| 4,509,598 A | 4/1985 | Earl et al. |
| 4,547,468 A | 10/1985 | Jones et al. |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,729 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,850,430 A | 7/1989 | Copeland et al. |
| 4,869,960 A | 9/1989 | Gibb et al. |
| 4,875,525 A | 10/1989 | Mana |
| 4,887,670 A | 12/1989 | Lord et al. |
| 4,888,240 A | 12/1989 | Graham et al. |
| 4,895,207 A | 1/1990 | Friedman |
| 4,921,820 A | 5/1990 | Rumpf et al. |
| 4,921,821 A | 5/1990 | Rumpf et al. |
| 4,923,714 A | 5/1990 | Gibb et al. |
| 4,969,523 A | 11/1990 | Martin et al. |
| 5,069,283 A | 12/1991 | Mack |
| 5,074,359 A | 12/1991 | Schmidt |
| 5,103,905 A | 4/1992 | Brannon et al. |
| 5,175,133 A | 12/1992 | Smith et al. |
| 5,240,654 A | 8/1993 | Smith et al. |
| 5,305,832 A | 4/1994 | Gupta et al. |
| 5,330,005 A | 7/1994 | Card et al. |
| 5,333,689 A | 8/1994 | Jones et al. |
| 5,422,183 A | 6/1995 | Sinclair et al. |
| 5,425,421 A | 6/1995 | Coleman et al. |
| 5,435,391 A | 7/1995 | Jones |
| 5,439,055 A | 8/1995 | Card |
| 5,443,633 A | 8/1995 | Hirsbrunner et al. |
| 5,492,178 A | 2/1996 | Nguyen |
| 5,501,273 A | 3/1996 | Puri |
| 5,515,920 A | 5/1996 | Luk |
| 5,531,274 A | 7/1996 | Bienvenu, Jr. |
| 5,547,506 A | 8/1996 | Rae et al. |
| 5,582,249 A | 12/1996 | Caveny et al. |
| 5,582,250 A | 12/1996 | Constien |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair et al. |
| 5,908,073 A | 6/1999 | Nguyen et al. |
| 5,916,933 A | 6/1999 | Johnson et al. |
| 5,921,317 A | 7/1999 | Dewprashad et al. |
| 5,924,488 A | 7/1999 | Nguyen et al. |
| 5,948,734 A | 9/1999 | Sinclair et al. |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,059,034 A | 5/2000 | Rickards et al. |
| 6,070,666 A | 6/2000 | Montgomery |
| 6,079,492 A | 6/2000 | Hoogteerjiling et al. |
| 6,114,410 A | 9/2000 | Betzold |
| 6,116,342 A | 9/2000 | Clark et al. |
| 6,138,760 A | 10/2000 | Lopez et al. |
| 6,169,058 B1 | 1/2001 | Le et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |

(56) References Cited

U.S. PATENT DOCUMENTS

| | | |
|---|---|---|
| 6,248,838 B1 | 6/2001 | Albright |
| 6,311,773 B1 | 11/2001 | Todd et al. |
| 6,315,041 B1 | 11/2001 | Carlisle |
| 6,328,105 B1 | 12/2001 | Betzold |
| 6,330,916 B1 | 12/2001 | Rickards et al. |
| 6,348,629 B1 | 2/2002 | Albright |
| 6,364,018 B1 | 4/2002 | Brannon et al. |
| 6,367,548 B1 | 4/2002 | Purvis et al. |
| 6,372,678 B1 | 4/2002 | Youngman et al. |
| 6,399,546 B1 | 6/2002 | Chang et al. |
| 6,406,789 B1 | 6/2002 | McDaniel et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,491,099 B1 | 12/2002 | Di Lullo Arias et al. |
| 6,503,676 B2 | 1/2003 | Yamashita et al. |
| 6,508,305 B1 | 1/2003 | Brannon et al. |
| 6,528,157 B1 | 3/2003 | McDaniel et al. |
| 6,541,579 B2 | 4/2003 | Albright |
| 6,579,947 B2 | 6/2003 | Heitz et al. |
| 6,582,819 B2 | 6/2003 | McDaniel et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | Dias da Silva |
| 6,772,838 B2 | 8/2004 | Dawson et al. |
| 6,776,235 B1 | 8/2004 | England |
| 6,830,105 B2 | 12/2004 | Theising |
| 6,892,813 B2 | 5/2005 | Nguyen et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,044,220 B2 | 5/2006 | Nguyen et al. |
| 7,066,258 B2 | 6/2006 | Justus et al. |
| 7,086,460 B2 | 8/2006 | Nguyen et al. |
| 7,153,575 B2 | 12/2006 | Anderson et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,226,971 B2 | 6/2007 | Ramesh et al. |
| 7,270,879 B2 | 9/2007 | McCrary |
| 7,271,133 B2 | 9/2007 | Weaver et al. |
| 7,303,018 B2 | 12/2007 | Cawiezel et al. |
| 7,350,572 B2* | 4/2008 | Fredd ............... C09K 8/72 166/279 |
| 7,361,693 B2 | 4/2008 | Albright et al. |
| 7,426,961 B2 | 9/2008 | Stephenson et al. |
| 7,638,468 B2 | 12/2009 | Gupta |
| 7,726,399 B2 | 6/2010 | Brannon et al. |
| 7,913,762 B2 | 3/2011 | Wheeler et al. |
| 8,061,424 B2 | 11/2011 | Willberg et al. |
| 8,173,581 B2* | 5/2012 | Huang ............... C09K 8/68 166/305.1 |
| 8,936,085 B2 | 1/2015 | Boney et al. |
| 2002/0023752 A1* | 2/2002 | Qu ............... C09K 8/68 166/308.1 |
| 2003/0050432 A1 | 3/2003 | Ramesh et al. |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0072700 A1 | 4/2004 | Gupta et al. |
| 2004/0224165 A1 | 11/2004 | Kondoh et al. |
| 2004/0244978 A1 | 12/2004 | Shaarpour |
| 2004/0261996 A1 | 12/2004 | Munoz et al. |
| 2005/0016732 A1 | 1/2005 | Brannon et al. |
| 2005/0028976 A1 | 2/2005 | Nguyen |
| 2005/0028979 A1 | 2/2005 | Brannon et al. |
| 2005/0059558 A1 | 3/2005 | Blauch et al. |
| 2005/0089631 A1 | 4/2005 | Nguyen et al. |
| 2005/0130848 A1 | 6/2005 | Todd et al. |
| 2005/0244641 A1 | 11/2005 | Vinvent |
| 2005/0272612 A1 | 12/2005 | Dawson et al. |
| 2005/0274523 A1 | 12/2005 | Brannon et al. |
| 2006/0073980 A1 | 4/2006 | Brannon et al. |
| 2006/0185848 A1 | 8/2006 | Surjaatmadja et al. |
| 2008/0139416 A1 | 6/2008 | Rimassa et al. |
| 2008/0179057 A1 | 7/2008 | Dawson |
| 2010/0200235 A1* | 8/2010 | Luo ............... C09K 8/50 166/284 |
| 2010/0263866 A1* | 10/2010 | Huang ............... C09K 8/506 166/282 |
| 2011/0180259 A1* | 7/2011 | Willberg ............... C09K 8/68 166/280.2 |
| 2012/0024530 A1 | 2/2012 | Todd et al. |
| 2012/0073809 A1* | 3/2012 | Clum ............... C09K 8/602 166/270 |
| 2012/0085536 A1 | 4/2012 | Aboudwarej et al. |
| 2012/0267102 A1* | 10/2012 | Huang ............... C09K 8/032 166/279 |
| 2012/0285692 A1* | 11/2012 | Potapenko ............ E21B 21/003 166/308.1 |
| 2013/0168096 A1 | 7/2013 | Parkhonyuk et al. |
| 2014/0178325 A1* | 6/2014 | Martinez-Castro ...... C09D 7/02 424/70.16 |
| 2015/0129214 A1* | 5/2015 | Boney ............... E21B 33/13 166/284 |
| 2015/0233226 A1* | 8/2015 | Holzhauser ............... C09K 8/80 166/280.1 |

FOREIGN PATENT DOCUMENTS

| | | |
|---|---|---|
| EP | 0773343 A2 | 5/1997 |
| EP | 1023382 B1 | 8/2006 |
| GB | 2319796 A | 6/1998 |
| WO | 0005302 A1 | 2/2000 |
| WO | 0166908 A2 | 9/2001 |
| WO | 0226656 A1 | 4/2002 |
| WO | 2004083600 A1 | 9/2004 |
| WO | 2011018257 A1 | 2/2011 |

OTHER PUBLICATIONS

Kaageson-Loe et al. "Particulate-Based Loss-Prevention Material—The secrets of Fracture Sealing Revealed" SPE 112595 Dec. 2009.*

Savari et al. "Engineered LCM Design Yields Novel Activating Material for Potential Application in Severe Lost Circulation Scenarios" SPE 164748 Apr. 2013.*

Savari et al. "Improved Lost Circulation Treatment Design and Testing Techniques Minimize Formation Damage" SPE 143603 Jun. 2011.*

Reddy et al. "Activator development for Controlling Degradation Rates of Polymeric Diverting Agents" SPE 164117 Feb. 2014.*

Glasbergen, G., Todd, B. L., Van Domelen, M. S., & Glover, M. D. (Jan. 1, 2006). Design and Field Testing of a Truly Novel Diverting Agent. Society of Petroleum Engineers. SPE 102606 doi:10.2118/102606-MS.*

Nitters et al. "Granular Diverting Agents Selection, Design and Performance" Spe 18884, 1989.*

Solares, J. R., Al-Harbi, M., Al-Sagr, A. M., Amorocho, R., & Ramanathan, V. (Jan. 1, 2008). Successful Application of Innovative Fiber-Diverting Technology Achieved Effective Diversion in Acid Stimulation Treatments in Saudi Arabian Deep Gas Producers. Society of Petroleum Engineers SPE 102606. doi:10.2118/115528-MS.*

Spectra Chemical Catalog, 2013, pp. 1-46.*

Frank F. Chang, Xiandong Qiu, Hisham A. Nasr-El-Din; "Chemical Diversion Techniques Used for Carbonate Matrix Acidizing: An Overview and Case Histories" 2007 SPE International Symposium on Oilfield Chemistry; SPE 106444; Feb. 28-Mar. 2, 2007; Houston, Texas.

Dave Allison; "Accessfrac Service Diversion Technology"; HO9034; Jan. 30, 2011; 45 pages; Haliburton Energy Services.

(56) References Cited

OTHER PUBLICATIONS

Halliburton; "AccessFrac Stimulation Service: Enhanced Proppant Distribution Provides Improved Access to Complex Fracture Networks in Shale Formations"; HO8720; Nov. 2011; 2 pages; Haliburton Production Enhancement.

Wood et al.; Ultra-Lightweight Proppant Development Yields Exciting New Opportunities in Hydraulic Fracturing Design; SPE 84309; Society of Petroleum Engineers. Inc; 2003.

Gupta et al: The History and Success of Liquid CO2 and CO2/N2 Fracturing System; SPE 40016; Society of Petroleum Engineers, Inc: 1998.

* cited by examiner

METHOD OF USING DIVERTER AND PROPPANT MIXTURE

This application is a continuation-in-part application of U.S. patent application Ser. No. 14/461,123, filed on Aug. 15, 2014, which is a continuation-in-part of U.S. patent application Ser. No. 13/928,006, filed on Jun. 26, 2013, which claims the benefit of U.S. patent application Ser. No. 61/664,640, filed on Jun. 26, 2012, all of which are herein incorporated by reference.

FIELD OF THE DISCLOSURE

The disclosure relates to use of a mixture of a dissolvable diverter and proppant to enhance the production of hydrocarbons from high permeability zones of a fracture network near a wellbore.

BACKGROUND OF THE DISCLOSURE

The success of stimulation operations, such as hydraulic fracturing and acidizing, depends on the production of hydrocarbons from high permeability zones as well as low permeability zones within the fracture network. In order to optimize the production of hydrocarbons from low permeability zones, chemical diverters have been used to divert the flow of well treatment fluids (such as fracturing fluids and acidizing fluids) from higher permeability zones to lower permeability zones.

Exemplary chemical diverting agents include dissolvable particulates, such as aliphatic polyesters like polylactic acids, phthalic anhydride, benzoic acid and solid hydrocarbon-based materials. When pumped into open hole fractures or through perforated casing, such diverters bridge off and prevent additional fluid flow into higher permeability zones. As a result, well treatment fluids (such as fracturing fluids and acidizing fluids) flow into other areas of lesser conductivity. Thus, chemical diverting agents achieve diversion by increasing flow resistance inside created channels within the fracture network.

Diverting agents often hamper however conductivity in productive zones once the face of such zones have been plugged or blocked with a diverter. This is especially the in those productive zones near the wellbore. Alternative methods have therefore been sought for enhancing the production of hydrocarbons from higher permeability zones of a fracture network which have been diverted, especially those zones near the wellbore.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

This disclosure relates to a method of enhancing the production of hydrocarbons within a fracture network from high permeability zones especially those high permeability zones near the wellbore of the fracture network.

In an embodiment, the disclosure relates to a method of stimulating the production of hydrocarbons from a subterranean formation penetrated by a wellbore by flowing into a high permeability zone of a fracture within a subterranean formation near the wellbore a mixture comprising a dissolvable diverter and a proppant. At least a portion of the high permeability zone is propped open with the proppant of the mixture. At least a portion of the high permeability zone is blocked with the diverter. A fluid is then pumped into the subterranean formation and into a lower permeability zone of the formation farther from the wellbore. The diverter is dissolved and hydrocarbons are produced from the high permeability zone and the lower permeability zones of the fracture.

In another embodiment of the disclosure, a method of enhancing the productivity of fluid from a well is provided using a fluid containing a dissolvable diverter. In this method, a first fluid is pumped into a subterranean formation penetrated by a well at a pressure sufficient to create or enhance a fracture near the wellbore. The first fluid contains a mixture of a diverter and a proppant. The diverter is dissolvable at in-situ conditions for producing fluid from the well. The first fluid then flows into a high permeability zone of the fracture. At least a portion of the high permeability zone is propped open with the proppant of the mixture. At least a portion of the high permeability zone is blocked with the diverter. A second fluid is then pumped into the subterranean formation and into a lower permeability zone of the subterranean formation farther from the wellbore. The diverter which blocks at least a portion of the high permeability zone near the wellbore is then dissolved at in-situ reservoir conditions. Fluid is then produced from the high permeability zone and the lower permeability zone.

In another embodiment, a method of stimulating a subterranean formation penetrated by a wellbore with a fluid containing a diverter and a proppant is provided. In this method, a casing within the wellbore is perforated. A channel extending from the casing into the subterranean formation is created. A fluid containing a mixture of a diverter and a proppant is then pumped into the wellbore at a pressure sufficient to create or enlarge a fracture near the wellbore. The diverter is dissolvable at in-situ conditions. The fluid containing the mixture is then flowed into a high permeability zone within the fracture near the wellbore. At least a portion of the high permeability zone is blocked with the diverter. The sized particle distribution of the diverter is sufficient to at least partially block the penetration of a second fluid into the high permeability zone of the formation. A second fluid is then pumped into the subterranean formation and into a lower permeability zone of the formation farther from the wellbore. The diverter near the wellbore is then dissolved in-situ reservoir conditions. Fluid is then produced from the high permeability zone containing the proppant of the mixture.

In another embodiment of the disclosure, a method of enhancing the productivity of fluid from the near wellbore region of a well penetrating a subterranean formation is provided. In this embodiment, a first fluid is pumped into a high permeability zone of a fracture near the wellbore. The first fluid contains a mixture of a diverter and a proppant. The diverter is dissolvable at in-situ reservoir conditions. The first fluid then flows into the high permeability zone of the fracture. At least a portion of the high permeability zone is propped open with the proppant of the first mixture. A portion of the high permeability zone is blocked with the diverter. A second fluid containing a diverter is then pumped into the subterranean formation and into a lower permeability zone of the formation farther from the wellbore followed by the pumping of a proppant laden fluid into a zone of lower permeability of the formation. The steps of adding a second fluid and then a proppant laden fluid may be repeated. The diverter blocking at least portion of the high permeability zone near the wellbore may then be dissolved. Fluid may then be produced from the high permeability zone and the zone of lower permeability.

Characteristics and advantages of the present disclosure described above and additional features and benefits will be readily apparent to those skilled in the art upon consideration of the following detailed description of various embodiments and referring to the accompanying drawing.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
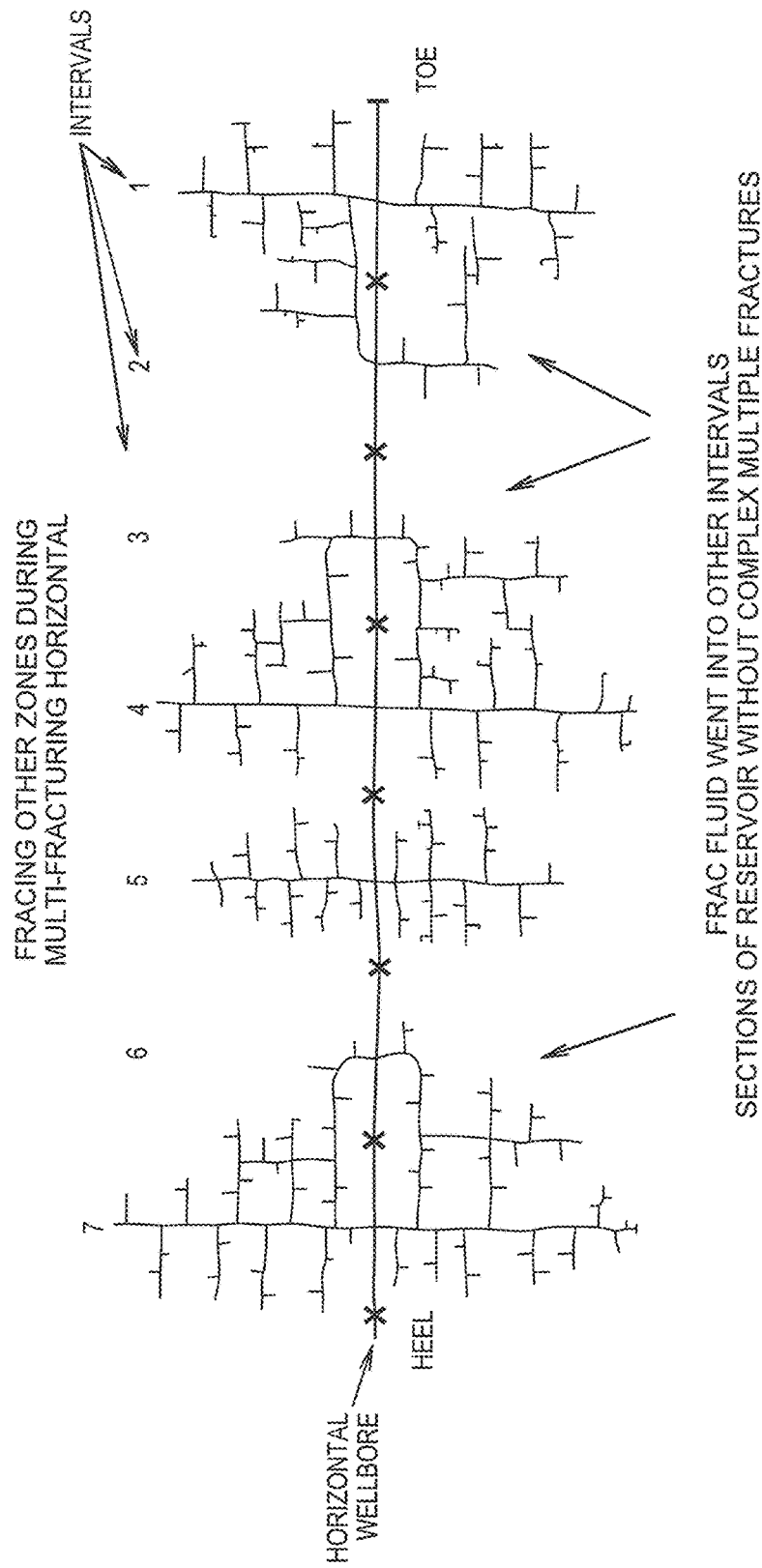
FIG. 1 illustrates the reduction in fracturing areas which are outside of intervals subjected to fracturing by use of the mixture disclosed herein.

Characteristics and advantages of the present disclosure and additional features and benefits will be readily apparent to those skilled in the art upon consideration of the following detailed description of exemplary embodiments and the Figures of the present disclosure. It should be understood that the description and Figures herein, being of example embodiments, are not intended to limit the claims of this patent or any patent or patent application claiming priority hereto. Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ."

In an embodiment, a mixture of a dissolvable diverter and a proppant may be used in a stimulation operation in order to enhance the production of fluids within a subterranean formation. As used herein, the term "subterranean formation" shall include carbonate formations, such as limestone, chalk or dolomite as well as subterranean sandstone or siliceous formations in oil and gas wells, including quartz, clay, shale, silt, chert, zeolite or a combination thereof. The term shall also refer to coal beds having a series of natural fractures, or cleats used in the recovery of natural gases, such as methane, and/or sequestering a fluid which is more strongly adsorbing than methane, such as carbon dioxide and/or hydrogen sulfide.

Typically, the downhole temperature of the wellbore is between from about 80° F. to about 400° F. The dissolvable diverter particulates are capable of diverting a well treatment fluid from a high permeability zone to a low permeability zone of a subterranean formation at such bottomhole temperatures. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

While the mixture may be used to increase the productivity of low permeability zones within the fracture network of horizontal as well as vertical wellbores, it is advantageously used to promote the production of hydrocarbon fluids near the wellbore of the perforating site (entrance into the reservoir). Thus, after the casing within the wellbore is secured, the casing may be perforated to provide a channel near the wellbore which extends from the casing into the subterranean formation. The mixture of dissolvable diverter and proppant is then pumped into the channel through the perforated casing. The well treatment fluid containing the diverter particulates may be pumped directly to the high permeability zone of the well formation.

Figure 2:
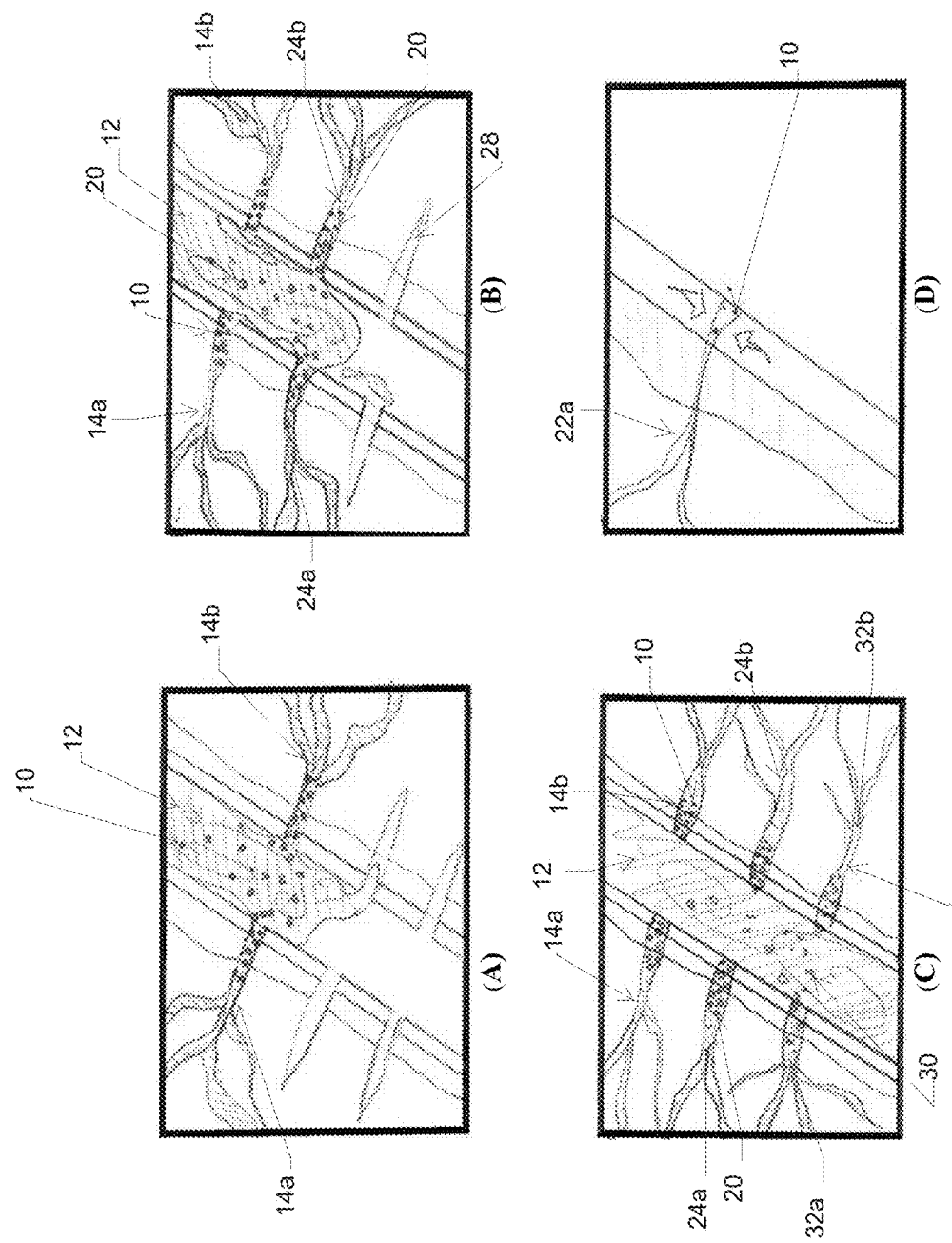
FIGS. 2 (A), (B), (C) and (D) depict a stimulation method using a dissolvable diverter fluid.

FIG. 2 illustrates the use of a diverting fluid in the production of fluids from lower permeability zones of a fracture network within a subterranean formation. The diverting fluid contains diverter particulates which are capable of spreading the well treatment fluid deeper into subterranean formations. The well treatment fluid may include fracturing fluids and acidizing fluids. The diverter particulates may be a part of the well treatment fluid. Alternatively, a well treatment fluid not containing the diverter particulates may be pumped into the formation after the diverting particulate have blocked or plugged (at least partially) the face of one zone within the fracture network. In an embodiment, the diverter particulates may be pumped into the formation in stages. A stage containing a well treatment fluid but not diverter particulates may be pumped into the formation after any or all of the stages containing the diverter particulates.

In FIG. 2(A), diverter particulates 20 are introduced into fracture 22 of high permeability within a fracture network. The diverter particulates are capable of diverting well treatment fluid 24 from fracture 22 to fracture 26 having lower permeability than fracture 22. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

The solid particulates of diverter 20 typically bridge the flow spaces of fractures on the face of the formation and form a filter cake. For instance, when employed in acid fracturing, the particulates are of sufficient size to bridge the flow space (created from the reaction of the injected acid with the reservoir rock) without penetration of the matrix. By being filtered at the face of the formation, a relatively impermeable or low permeability filter cake is created on the face of the formation. The pressure drop though the filter cake increases the flow resistance and diverts treatment fluid to the less permeable zones of the formation.

The size distribution of the particulates of the diverter should be sufficient to block the penetration of the fluid into the high permeability zone of the formation. The filter cake is more easily formed when at least 60%, more preferably 80%, of the diverter particulates within the well treatment fluid have a particle size between from about 150 µm to about 2000 µm.

When used in stimulation operations, the particle size of the particulates is such that the particulates may form a bridge on the face of the rock. Alternatively, the particle size of the particulates may be such that they are capable of flowing into the fracture (as illustrated in FIG. 2) and thereby pack the fracture in order to reduce the permeability of at least some of the fractures in the formation.

As illustrated in FIG. 2(A), a majority of diverter particulates 10 in a well treatment fluid enter channel 12 and then proceed into one or more fractures 14 [illustrated as two fractures 14a and 14b in FIG. 2(A)] of high permeability (or non-damaged zone). A temporary block, plug, bridge or viscous pill is shown as forming (at least partially) at fracture 14a and 14b either within the fracture or at the interface of the fracture and channel 12. The terms "block" "plug", "bridge" and "viscous pill" shall be included within the term "bridge" as used herein. Such temporary bridges cause a pressure increase and divert fluid to a lower permeability zone, typically deeper into the subterranean formation, within the fracture network within the formation.

FIG. 2(B) illustrates the pumping of a second stage of a well treatment fluid containing diverter particulates 20 into channel 12. The fluid is curtailed from entering into fracture 14a and 14b by the presence of diverter particulates 10 and proceeds to lower permeability zones within the fracture network, represented as fractures 24a and 24b. Diverter particulates 20 bridge (at least partially) the flow of fluid in fracture 24a and 24b or the interface of the face of the fracture and channel 12.

A third treatment fluid is then pumped into channel 12, illustrated in FIG. 2(C), containing particulates 30 and is diverted into fractures 32a and 32b of lower permeability. The fluid is (at least partially) curtailed from entering into fractures 14a, 14b, 24a and 24b which are already at least partially blocked by diverter particulates 10 and 20, respectively.

Over a period of time, the diverters bridging the fractures dissolve. This in turn causes closure or collapse of the fractures. FIG. 2(D) illustrates the closing or collapsing of a fracture of high permeability zone (such as fracture 14a) once plugged by diverter particulates 10. The production of fluids from such closed or collapsed fractures is limited by the restricted pathway within the fracture. Such inhibition presents an acute problem with high permeability zones within a fracture network especially those near the wellbore.

Figure 3:
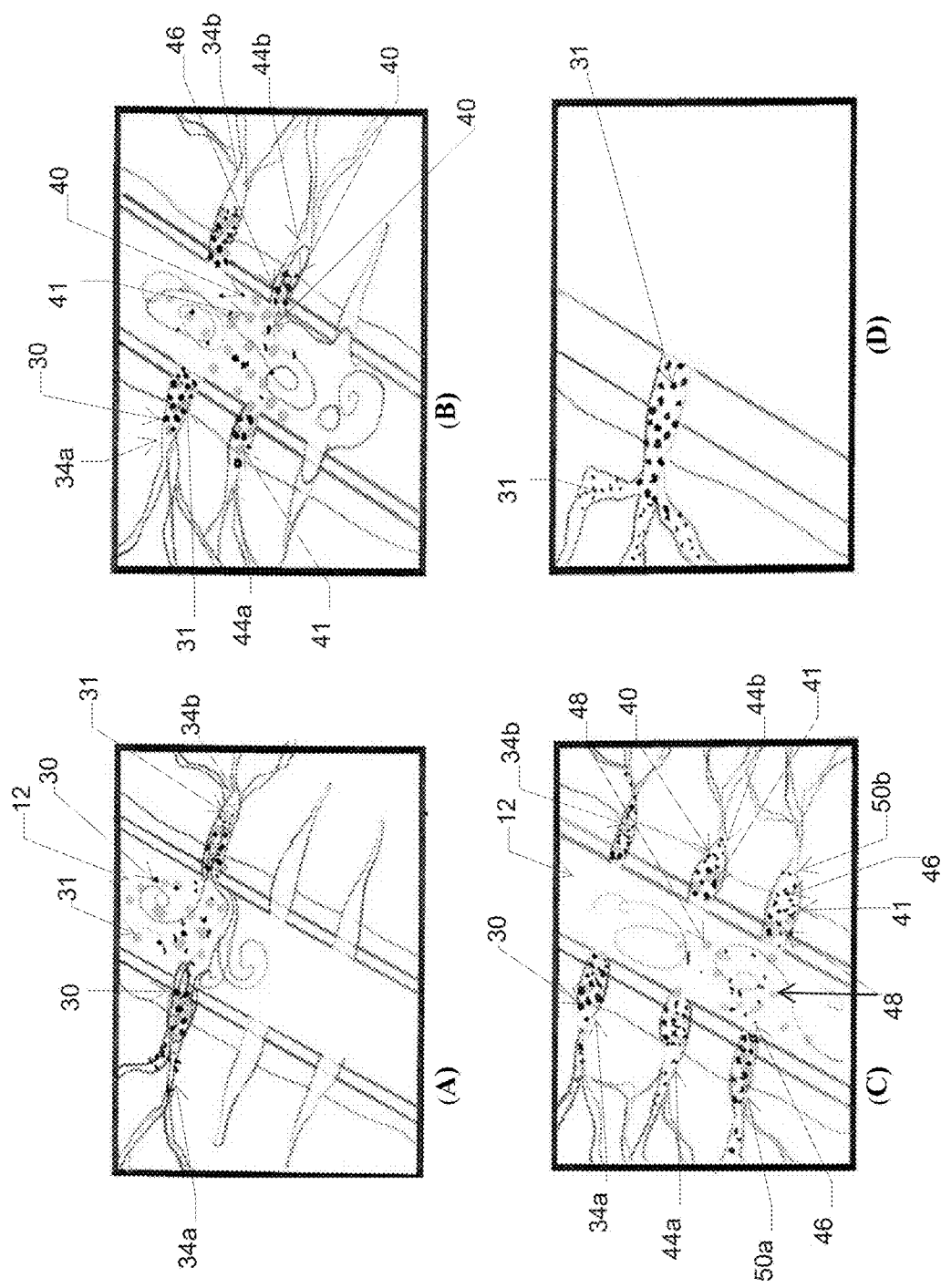
FIGS. 3 (A), (B), (C) and (D) depict a stimulation method using a mixture of dissolvable diverter and proppant.

FIG. 3 illustrates the addition of a fluid containing a mixture of dissolvable diverter and proppant. Typically, the amount of diverter particulates in the well treatment fluid introduced into the channel is between from about 0.01 to about 30 weight percent and the proppant of proppant in the well treatment fluid is between from about 0.01 to about 3% by weight.

As illustrated in FIG. 3(A), a majority of diverting fluid containing diverter particulates 30 and proppant 31 may enter into the high permeability (or non-damaged zone) represented by fractures 34a and 34b within a fracture network and forming (at least partially) a temporary bridge either within the fracture or at the interface of the fracture face and channel 12. FIG. 3(A) illustrates diverter particulates 30 forming a bridge at the interface of the channel 12 and within the channel and proppant 31 entering the fracture within the channel and within the fracture.

FIG. 3(B) illustrates the pumping of a second stage of a treatment fluid containing diverter particulates 40. As illustrated in FIG. 3(B), the second stage fluid contains proppant 41 though proppant does not necessarily have to present in the second stage fluid. Proppant 41 may not be the same proppant as proppant 31. Likewise, the dissolvable diverter particulates 40 may or may not be the same diverter particulates as particulates 30. Diverter particulates 30 curtail the second well treatment fluid from entering (at least substantially) into fracture 34a and/or 34b. Diverter particulates 40 of the second fluid are shown as forming a bridge or plug (at least partially) within fractures 44a and 44b and at the face of fractures 44a and 44b with channel 12. This allows the well treatment fluid to flow further from the perforating site into fracture 44a and 44b of low permeability.

FIG. 3(C) illustrates the pumping of a third stage of treatment fluid containing diverter particulates 46 and proppant 48 (which may optionally be present in the fluid). The third stage fluid is (at least partially) curtailed from entering into fractures 34a, 34b, 44a and 44b which are already at least partially bridged or plugged with diverter particulates 30 and 40. Thus, the third stage treatment fluid containing diverter particulates 46 and optional proppant 48 flow further away from the near wellbore region through channel 12 and into fractures of lower permeability, represented as 50a and 50b. The process described may be repeated as desired.

Over a period of time, the diverters which bridge or plug the fractures dissolve. Those fractures diverted by a fluid containing both diverter particulates and proppant, as illustrated in FIG. 3(D), remain open due to the presence of the proppant in the mixture; the proppant not being dissolvable at at-situ reservoir conditions. The production of fluids from such fractures is thereby enhanced. The use of the mixture is particularly of use in those high permeability zones near the wellbore which, as shown in FIG. 2(D), typically collapse when the diverter dissolves.

The bridging or plugging (at least partially) of higher permeability zones within a fracture network provides a depth of invasion which is related to the pore throat diameter. For a given formation type, the invasion depth is directly proportional to the nominal pore throat diameter of the formation. Since varying depths of invasion occur throughout the formation based upon the varying permeability or damage throughout the treated zone, the ability of the treatment fluid to invade into pore throats is dependent on the difference between pore throat sizing of the damaged and non-damaged formation. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the treatment fluid may be placed in these intervals.

Suitable dissolvable diverters include phthalic anhydride, terephthalic anhydride, phthalic acid, terephthalic acid, gilsonite, rock salt, benzoic acid flakes, polylactic acid and mixtures thereof.

Other suitable diverters include unimodal or multimodal polymeric mixtures of ethylene or other suitable, linear or linear, branched alkene plastics, such as isoprene, propylene, and the like. Such polymeric mixtures may be described as ball sealers set forth in U.S. Pat. No. 7,647,964, herein incorporated by reference.

Such ethylene polymeric mixtures typically comprise ethylene and one or more co-monomers selected from the group consisting of alpha-olefins having up to 12 carbon atoms, which in the case of ethylene polymeric mixtures means that the co-monomer or co-monomers are chosen from alpha-olefins having from 3 to 12 carbon atoms (i.e., $C_3$-$C_{12}$), including those alpha-olefins having 3 carbon atoms, 4 carbon atoms, 5 carbon atoms, 6 carbon atoms, 7 carbon atoms, 8 carbon atoms, 9 carbon atoms, 10 carbon atoms, 11, carbon atoms, or 12 carbon atoms. Alpha-olefins suitable for use as co-monomers with ethylene in accordance with the present invention can be substituted or un-substituted linear, cyclic or branched alpha.-olefins. Preferred co-monomers suitable for use with the present invention include but are not limited to 1-propene, 1-butene, 4-methyl-1-pentene, 1-pentene, 1-hexene, 1-octene, 1-decene, 1-dodecene, and styrene.

Typical ethylene polymeric mixtures which comprise the ball sealers of the present invention include ethylene-octene polymeric mixtures, ethylene-butene mixtures, ethylene-styrene mixtures, and ethylene-pentene mixtures. More typically, the deformable ball sealers comprise ethylene-octene, ethylene-butene, and ethylene-pentene polymeric mixtures. A particular ethylene-octene copolymer component of the deformable ball sealer composition of the present invention is a substantially linear elastic olefin polymer.

The ethylene-α-olefin polymers useful herein may include linear copolymers, branched copolymers, block copolymers, A-B-A triblock copolymers, A-B diblock copolymers, A-B-A-B-A-B multiblock copolymers, and radial block copolymers, and grafted versions thereof, as well as homopolymers, copolymers, and terpolymers of ethylene and one or more alpha-olefins. Examples of useful compatible polymers include block copolymers having the general configuration A-B-A, having styrene endblocks and ethylene-butadiene or ethylene-butene midblocks, linear styrene-isoprene-styrene polymers, radial styrene-butadiene-styrene polymers and linear styrene-butadiene-styrene polymers.

Other polymers and copolymers include water soluble ball sealers composed of collagen, commonly referred to as biosealers.

Preferred diverting agents for use in the disclosure include those of structural formula (III):

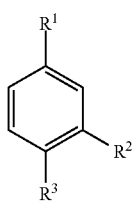
(III)

wherein:
R¹ is —COO—(R⁵O)$_y$—R⁴ or —H;
R² and R³ are selected from the group consisting of —H and —COO—(R⁵O)$_y$—R⁴;
provided both R² or R³ are —COO—(R⁵O)$_y$—R⁴ when R¹ is —H and
further provided only one of R² or R³ is —COO—(R⁵O)$_y$—R⁴ when R¹ is —COO—(R⁵O)$_y$—R⁴;
R⁴ is —H or a $C_1$-$C_6$ alkyl group;
R⁵ is a $C_1$-$C_6$ alkylene group; and
each y is 0 to 5.

Alternatively, the particulates may be an anhydride of the compound of structural formula (III).

In a preferred embodiment, R² of the compound of formula (III) is —H and R³ is —COO—(R⁵O)$_y$—R⁴. In an especially preferred embodiment, the compound of formula (III) is phthalic acid (wherein y is 0 and R¹ and R⁴ are —H).

In another preferred embodiment, the compound of formula (III) is phthalic acid anhydride.

Still in another preferred embodiment, R² of the compound of formula (III) is —COO—(R⁵O)$_y$—R⁴ and R³ is —H. In an especially preferred embodiment, the compound of formula (III) is terephthalic acid (wherein y is 0 and R² and R⁴ are —H). In another preferred embodiment, the compound of formula (III) is terephthalic acid anhydride.

Other diverters include those aliphatic polyesters having the general formula of repeating units illustrated in structural formula (I) below:

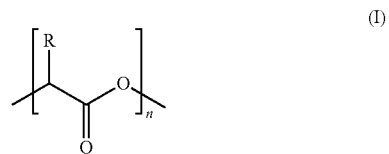
(I)

where n is an integer between 75 and 10,000 and R is selected from the group consisting of hydrogen, alkyl (preferably a $C_1$-$C_6$ alkyl), aryl (preferably a $C_6$-$C_{18}$ aryl), alkylaryl (preferably having from about 7 to about 24 carbon atoms), acetyl, heteroatoms (such as oxygen and sulfur) and mixtures thereof. In a preferred embodiment, the weight average molecular weight of the aliphatic polyester is between from about 100,000 to about 200,000.

In those instances, where the bottomhole temperature within the well is less than 250° F., a mixture of the dissolvable particulates of formula (III) and formula (I) have been found to be desirable. In such cases, the weight ratio of particulates of formula (I) and particulates of formula (III) introduced into the well is typically between from about 95:5 to about 5:95 and more typically between from about 40:60 to about 60:40. Typically, the amount of diverter particulates (in the mixture) within the fluid introduced into the well is between from about 0.01 to about 30 weight percent (based on the total weight of the fluid) and the amount of the compound(s) of formula (III) in the fluid is from about 0.01 to about 3% by weight.

The mixture of particulates are particularly effective when placed into wells having bottom hole temperatures between from about 140° F. to about 190° F. For instance, the compound of formula (III) enhances the performance of the aliphatic polyester of formula (I) since in the absence of the compound of formula (III) the aliphatic polyester is non-dissolvable or sparingly soluble at bottomhole temperatures less than 250° F. When used in combination with the compound of formula (III), the aliphatic polyesters may be used in reservoirs having a bottomhole temperature less than 250° F.

A preferred aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula (I) without any limitation as to how the polymer was made such as from lactides, lactic acid, or oligomers, and without reference to the degree of polymerization.

The lactide monomer exists generally in three different forms: two stereoisomers L- and D-lactide and racemic D,L-lactide (meso-lactide). The oligomers of lactic acid, and oligomers of lactide may be defined by the formula:

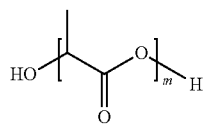
(II)

where m is an integer: 2≤m≤75. Preferably m is an integer: 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. Poly(D,L-lactide) may be a more amorphous polymer with a resultant faster hydrolysis rate. The stereoisomers of lactic acid may be used individually or combined. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters.

As an alternative to the aliphatic polyesters of formula (I), the phthalic acid or phthalic acid anhydride of formula (III) may be used to enhance the activity of other aliphatic polyesters including star- and hyper-branched aliphatic polyesters polymers as well as other homopolymers, random, block and graft copolymers. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; poly(glycolide); poly(ε-caprolactone); poly(hydroxybutyrate); poly(anhydrides); aliphatic polycarbonates; poly(orthoesters); poly(amino acids); poly(ethylene oxide); and polyphosphazenes.

The particulates defining the mixture or use in the method disclosed herein have a sized particle distribution effective to block the penetration of the fluid into the high permeability zone of the formation. Typically, the particle size distribution of the particulates is in the range from about 0.1 micron to about 1.0 millimeter.

The dissolvable particulates may be of any shape. For instance, the particulates may be substantially spherical, such as being beaded, or pelleted. Further, the particulates may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature.

The particulates may be partially, but not fully, dissolved at in-situ reservoir conditions. Typically, the particulates are fully dissolved over time at bottomhole temperatures.

The fluid of the well treatment fluid disclosed herein may be water, salt brine or slickwater. Where the well treatment fluid contains diverter particulates and/or proppant, the fluid is one which is suitable for transporting the particulates into the reservoir and/or subterranean formation. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

The fluid of the treatment fluid may further be foamed with a liquid hydrocarbon or a gas or liquefied gas such as nitrogen or carbon dioxide. In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the treatment fluid containing the mixture of particulates and proppant may further be adjusted when desired. When adjusted, the fluid typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The fluid may be gelled or non-gelled. Typically the fluid is gelled by the inclusion of a viscosifying agent such as a viscosifying polymer or viscoelastic fluid. The fluid may contain a crosslinking agent though a crosslinking agent is not required. Generally, the viscosity of the fluid is greater than or equal to 10 cP at room temperature.

The mixture defined herein may also be used to create a complex fracture network within a formation. Thus, the mixture may be used as a fracturing fluid and may be pumped into the formation at a pressure sufficient to create or enlarge a primary fracture. In other instances, a fracturing fluid not containing the mixture may be pumped into the formation. Such other fracturing fluids may include those fluids containing a viscosifying agent other than that of the mixture defined herein. Further, the fracturing fluid used to create or enlarge the fracture may be slickwater. After the primary fracture is created or enlarged, a second fluid containing the mixture defined herein may be pumped into the formation. At least one secondary fracture having a directional orientation distinct from the directional orientation of the primary fracture may be created. The second fluid diverts the flow of the second fluid into the secondary fracture. This process may be repeated and multiple fluids containing the mixture defined herein may be pumped into the formation to divert the flow of a preceding fluid and to provide proppant to created fractures. In this manner, a complex fracture network may be created consisting of multiple fractures in the formation originating from the primary fracture.

The mixture defined herein may further be used to further limit the fracturing of zones in formations (such as shale formations) which are known to exhibit non-uniform interval coverage. Microseismic mapping and well temperature logging often show poor frac fluid distribution across each interval and re-fracturing of nearby intervals. By directing the placement of fluid containing particulates of the mixture within the fractured zones, out of intervals fracturing areas are reduced. This is shown in FIG. 1.

Re-fracturing of a formation using the mixture disclosed herein is especially useful in the re-fracturing of horizontal wells. In such cases, a portion of the wellbore or the entire lateral of the wellbore may be perforated in a multitude of locations, sometimes dozens of locations, from the original fracture stimulation. Further, the wellbore may have new perforated clusters added during the re-fracturing operation that are intended to be fracture treated for the first time. With all of such perforations open, a pill or plug of a fluid containing the particulates of the mixture defined herein may be pumped into the formation. The particulates plug off the zones that are readily accepting the fluid most rapidly such that the fluid moves toward the areas of the formation which are more difficult to treat.

The proppant for use in the mixture may be any proppant suitable for stimulation known in the art and may be deformable or non-deformable at in-situ reservoir conditions. Examples include, but are not limited to, conventional high-density proppants such as quartz, glass, aluminum pellets, silica (sand) (such as Ottawa, Brady or Colorado Sands), synthetic organic particles such as nylon pellets, ceramics (including aluminosilicates), sintered bauxite, and mixtures thereof.

In addition, protective and/or hardening coatings, such as resins to modify or customize the density of a selected base proppant, e.g., resin-coated sand, resin-coated ceramic particles and resin-coated sintered bauxite may be employed. Examples include Suitable proppants further include those set forth in U.S. Patent Publication No. 2007/0209795 and U.S. Patent Publication No. 2007/0209794, herein incorporated by reference.

Further, any of the ultra-lightweight (ULW) proppants may also be used. Such proppants are defined as having a density less than or equal to 2.45 g/cc, typically less than or equal to 2.25, more typically less than or equal to 2.0, even more typically less than or equal to 1.75. Some ULW proppants have a density less than or equal to 1.25 g/cc. Exemplary of such relatively lightweight proppants are ground or crushed walnut shell material that is coated with a resin, porous ceramics, nylon, etc.

In a preferred embodiment, the proppant is a relatively lightweight or substantially neutrally buoyant particulate material or a mixture thereof. Such proppants may be chipped, ground, crushed, or otherwise processed. By "relatively lightweight" it is meant that the proppant has an apparent specific gravity (ASG) at room temperature that is substantially less than a conventional proppant employed in hydraulic fracturing operations, e.g., sand or having an ASG similar to these materials. Especially preferred are those proppants having an ASG less than or equal to 3.25. Even more preferred are ultra-lightweight proppants having an ASG less than or equal to 2.25, more preferably less than or equal to 2.0, even more preferably less than or equal to 1.75, most preferably less than or equal to 1.25 and often less than or equal to 1.05.

By "substantially neutrally buoyant", it is meant that the proppant has an ASG close to the ASG of an ungelled or weakly gelled carrier fluid (e.g., ungelled or weakly gelled completion brine, other aqueous-based fluid, or other suitable fluid) to allow pumping and satisfactory placement of the proppant using the selected carrier fluid. For example, urethane resin-coated ground walnut hulls having an ASG of from about 1.25 to about 1.35 may be employed as a substantially neutrally buoyant proppant particulate in completion brine having an ASG of about 1.2. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid. (If the ungelled carrier fluid is slickwater with a friction reducer, which is typically a polyacrylamide, there is technically 1 to as much as 8 pounds per thousand of polymer, but such minute concentrations of polyacrylamide do not impart sufficient viscosity (typically <3 cP) to be of benefit).

Other suitable relatively lightweight proppants are those particulates disclosed in U.S. Pat. Nos. 6,364,018, 6,330,916 and 6,059,034, all of which are herein incorporated by reference. These may be exemplified by ground or crushed shells of nuts (pecan, almond, ivory nut, brazil nut, macadamia nut, etc); ground or crushed seed shells (including fruit pits) of seeds of fruits such as plum, peach, cherry, apricot, etc.; ground or crushed seed shells of other plants such as maize (e.g. corn cobs or corn kernels), etc.; processed wood materials such as those derived from woods such as oak, hickory, walnut, poplar, mahogany, etc. including such woods that have been processed by grinding, chipping, or other form of particalization. Preferred are ground or crushed walnut shell materials coated with a resin to substantially protect and water proof the shell. Such materials may have an ASG of from about 1.25 to about 1.35.

Further, the relatively lightweight particulate for use in the invention may be a selectively configured porous particulate, as set forth, illustrated and defined in U.S. Pat. No. 7,426,961, herein incorporated by reference.

A fluid containing the dissolvable diverter particulates and proppant may be pumped into the wellbore in alternative stages and may be separate by spacer fluids. The spacer fluid typically contains a salt solution such as NaCl, KCl and/or $NH_4Cl$. For instance, when used in an acid stimulation operation, it may be desirable to alternate the pumping of acid stimulation fluids and the fluid containing the dissolvable particulates and proppant. An exemplary pumping schedule may be (i) pumping an acid stimulation fluid; (ii) optionally pumping a spacer fluid; (iii) pumping a fluid containing the diverter particulates and proppant; (iv) optionally pumping a spacer fluid; and then repeating the cycle of steps (i), (ii), (iii) and (iv).

The fluid containing the diverter particulates and proppant may further contain additional well treatment fluid additives. These include one or more conventional additives to the well service industry such as a gelling agent, fluid loss additives, gel breaker, surfactant, demulsifier, biocide, mutual solvent, surface tension reducing agent, defoaming agent, demulsifier, non-emulsifier, scale inhibitor, gas hydrate inhibitor, enzyme breaker, oxidative breaker, buffer, clay stabilizer, acid, buffer, solvent or a mixture thereof.

Where the fluid containing the mixture is an acidizing fluid, it may be preferable to include within the fluid a corrosion inhibitor, a corrosion inhibitor intensifier, or a combination thereof. The purpose of these additives is to reduce the corrosive effects that the acids may have on the well tubulars. Suitable corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Fluids containing the mixture may also have an internal breaker built into the system to insure that the fluid viscosity can be reduced after a period of time. The internal breaker may also be an oxidizer such as, but not limited to, persulfates, such as ammonia persulfate and sodium persulfate, and peroxidizers such as hydrogen peroxide.

EXAMPLES

The following designations are used in the Example:

A: a 90:10 v/v mixture of phthalic anhydride:phthalic acid, 20/40 mesh, melting range[1]: 268-270° F.;

[1] Melting range represents the temperature at which the solid started to soften to when it was completely melted.

B: a 85:15 v/v mixture of phthalic anhydride:phthalic acid, 8/50 mesh, melting range: 268-356° F.;

C: polylactic acid, 14/70 mesh, melting range: 298-329° F.;

D: polylactic acid, 10/70 mesh, melting range: 336-345° F.

C&D were prepared by grinding pellets of polylactic acid, commercially available as INGEO® 4340-D from NatureWorks LLC, to the designated size.

Example 1

Phthalic anhydride (obtained from a commercial supplier) and Sample A (8 g of each) were first diluted in 100 mL deionized water or HCl 15% for 20 hours at 180° F., and then left for 3 hours at room temperature. The mixture was vacuum filtrated with 100 mL water and dried for 24 hours at 160° F. The results are set forth in Table I.

TABLE I

| Sample | Dissolved (%) | Melting Range[2], ° F. | Solvent |
|---|---|---|---|
| Commercial Phthalic Anhydride | 6 | 403 | Deionized water |
| Sample A | 7.5 | 401 | Deionized water |
| Sample A, crushed | 4 | 397-399 | Deionized water |
| Commercial Phthalic Anhydride | 4 | 412 | HCl 15% |
| Sample A | 0 | 410 | HCl 15% |
| Sample A, crushed | 16 | 415 | HCl 15% |

[2] Undissolved sample, not starting material.

FTIR and melting point of the recovered undissolved samples showed that the remaining phthalic anhydride had converted into phthalic acid.

Example 2

Samples of Sample A (each 5 g) were diluted in 100 mL of either deionized water (DI) or tap water for (1) 54 hours at 180° F. and (2) 64 hours at 140° F. and then left to cool at room temperature. The solids were vacuum filtrated with 100 mL water and dried for 24 h at 160° F. The results are set forth in Table II).

TABLE II

| 64 hr PERCENT SOLUBILITY @ 140° F. | | 54 hr PERCENT SOLUBILITY @ 180° F. | |
|---|---|---|---|
| tap water | DI | tap water | DI |
| 18.5 | 13.4 | 5.6 | 9.3 |

The FTIR and melting point of the recovered undissolved samples showed that the remaining phthalic anhydride had converted into phthalic acid. Table II illustrates that more phthalic anhydride was converted to phthalic acid at higher temperatures. Sample A was thus more suitable for lower temperature applications.

Example 3

Different initial weights of Sample A were diluted in 18 mL of deionized water for 24 hours at 250° F. using a digestion vessel. After leaving the samples to cool, they were vacuum filtrated with deionized water and dried for 24 hours at 160° F. The results are set forth in Table III. The FTIR and melting point of the recovered undissolved samples showed that the remaining phthalic anhydride had converted into phthalic acid.

TABLE III

| Initial Weight (g) | % dissolved |
|---|---|
| 1 | 55.6 |
| 0.5 | 83.7 |
| 0.25 | 100 |
| 0.1 | 100 |
| 0.05 | 100 |
| 0.025 | 100 |

Example 4

Different initial weights of Sample C were tested for solubility by using a digestion vessel (at 250° F. for 24 hours) and diluting in 18 mL of DI water, using different sample concentrations. The results are set forth in Table IV.

TABLE IV

| Amount (g) | % Dissolved |
|---|---|
| 1.000 | 100 |
| 0.500 | 100 |
| 0.250 | 100 |
| 0.100 | 100 |
| 0.050 | 100 |
| 0.025 | 100 |

Example 5

Samples were dissolved in water and heated in a water bath. After reaching room temperature, the samples were filtered via a vacuum. The recovered material was then dried overnight and the percentage of dissolved solids was calculated based on the amount of sample retained on a Whatman #41 filter paper. All samples were allowed to dry for at least 24 hours at approximately 160° F. The samples (2.5 total) were then tested for solubility in 50 mL of deionized water using different temperatures (heating for 24 or 48 hours). The 1:1 mixture of Sample B and Sample C were made by mixing equal amounts of each product (1.25 g) and diluting in 50 mL total deionized water. The results are set forth in Table V:

TABLE V

| SAMPLE | 24 hr | | 48 hr | | |
|---|---|---|---|---|---|
| | 140° F. | 180° F. | 80° F. | 180° F. | 300° F. |
| B | 8.7 | 21.6 | 19.9 | 5.4 | 11.0 |
| B | 6.1 | n/a | 24.1 | n/a | 10.5 |
| C | 0.31 | 1.1 | 0.99 | 9.9 | 99.3 |
| C | 0.30 | n/a | 0.98 | n/a | 99.2 |
| B:C | 10.9 | 31.1 | 13.8 | 30.1 | 90.5 |
| B:C | 10.2 | n/a | 12.9 | n/a | 87.2 |

Example 6

Additional solubility tests were performed using Sample B and Sample D (2.5 g total) in 50 mL of deionized water using different temperatures (heating for 24 or 48 hr). The 1:1 mixture of Sample B:Sample D was made by mixing equal amounts of each product (1.25 g) and diluting in 50 mL deionized water. The results are set forth in Table VI:

TABLE VI

| SAMPLE | 24 hr | | 48 hr |
|---|---|---|---|
| | 150° F. | 180° F. | 150° F. |
| B | 24.8 | 21.6 | 16.5 |
| D | 0.2 | 0.24 | 0.1 |
| 1:1 B:D | 20.2 | 23.1 | 16.7 |

The Examples illustrate that phthalic anhydride/phthalic acid is more suitable as a diverting agent in lower temperatures (180-250° F.) applications and polylactic acid is more suitable as a diverting agent at higher temperature higher temperature (>250° F.) applications. The Examples further illustrate, based on the solubility results, that phthalic anhydride/phthalic acid acts enhances lowering the temperature at which polylactic acid dissolves. When mixed with polylactic acid, the Examples illustrate that phthalic anhydride/phthalic acid acts to enhance the activity of polylactic acid, while lowering the temperature at which polylactic dissolves. Thus, when mixed with phthalic anhydride/phthalic acid, polylactic acid may be used in lower temperature applications.

Example 7

Conductivity tests of a mixture of 13.52 g (85 wt. %) phthalic acid anhydride and 2.38 g (15 wt. %) LiteProp™ 125 lightweight proppant, a product of Baker Hughes Incorporated, having an apparent specific gravity of 1.25 at room temperature, were conducted. The tests were performed according to a modified API RP 61 (1$^{st}$ Revision, Oct. 1, 1989) using an API 10 conductivity cell with Ohio sandstone wafer side inserts to simulate the producing formation. The mixture was then loaded between the sealed sandstone wafers to increase the propped width. The mixture exhibited a density of about 0.5 lb/ft$^2$. The conductivity cell was then placed on a press and was subjected to a closure stress of 5,000 psi and a temperature of 200° F. De-ionized water was then allowed to flow through the test pack at 10 ml/min and the baseline conductivity determined. The cell was then shut off for 24 hours at which the flow of de-ionized water was resumed and Darcy flow maintained. The results are set forth in Table VII.

TABLE VII

| TIME, Hours | STRESS, psi | CONDUC-TIVITY, md-ft | PERME-ABILITY, Darcies | WIDTH, Mm |
|---|---|---|---|---|
| 0 | 5000 | 559 | 118 | 1.44 |
| 24 | 5000 | 2176 | 474 | 1.40 |
| 50 | 5000 | 6787 | 1478 | 1.40 |

After flow of 50 hrs, minor traces of the diverter could be seen at the outlet of the cell and negligible undissolved diverter at the inlet of the cell.

Preferred embodiments of the present disclosure offer advantages over the prior art and are well adapted to carry out one or more of the objects of this disclosure. However, the present disclosure does not require each of the components and acts described above and are in no way limited to the above-described embodiments or methods of operation. Many variations, modifications and/or changes of the disclosure, such as in the components, operation and/or methods of use, are possible, are contemplated by the patent applicant(s), within the scope of the appended claims, and may be made and used by one of ordinary skill in the art without departing from the spirit or teachings of the disclosure and scope of appended claims.

What is claimed is:

1. A method of stimulating the production of hydrocarbons from a subterranean formation penetrated by a wellbore, the method comprising:
   (a) initiating or enhancing a fracture near the wellbore by pumping a first fluid into the subterranean formation, the first fluid containing a mixture of a dissolvable diverter and a proppant, wherein the diverter comprises at least one compound of the formula:

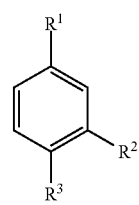

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ and $R^3$ are —COO—$(R^5O)_y$—$R^4$ when $R^1$ is —H and
further provided only one of $R^2$ or $R^3$ is —COO—$(R^5O)_y$—$R^4$ when $R^1$ is —COO—$(R^5O)_y$—$R^4$
$R^4$ is —H or a $C_1$-$C_6$ alkyl group;

$R^5$ is a $C_1$-$C_6$ alkylene group; and
each y is 0 to 5;
(b) flowing the mixture containing the dissolvable diverter and proppant into a high permeability zone of the initiated or enhanced fracture;
(c) propping open at least a portion of the high permeability zone with the proppant of the mixture and blocking at least a portion of the high permeability zone with the diverter;
(d) pumping a second fluid into the subterranean formation and into a lower permeability zone of the formation farther from the wellbore;
(e) dissolving the diverter blocking at least a portion of the high permeability zone near the wellbore; and
(f) producing hydrocarbons from the high permeability zone and the lower permeability zone while the proppant of the mixture of the first fluid remains in the high permeability zone.

2. The method of claim 1, wherein the diverter further comprises an aliphatic polyester having the general formula of repeating units:

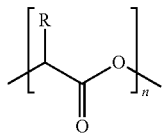

where n is an integer between 75 and 10,000 and R is independently selected from the group consisting of hydrogen, alkyl, aryl, alkylaryl, acetyl and heteroatoms.

3. The method of claim 2, wherein the aliphatic polyester has a particle size distribution in the range from about 0.1 micron to about 1.0 millimeter.

4. The method of claim 2, wherein the weight ratio of the diverter of (III) and the aliphatic polyester is from about 5:95 to about 95:5.

5. The method of claim 1, wherein the downhole temperature of the wellbore is between from about 80° F. to about 400° F.

6. The method of claim 1, wherein $R^1$ is —H and $R^3$ is —COO—$(R^5O)_y$—$R^4$.

7. The method of claim 6, wherein y is 0 and $R^4$ is —H.

8. The method of claim 1, wherein $R^1$ is —COO—$(R^5O)_y$—$R^4$ and $R^2$ is —H.

9. The method of claim 8, wherein y is 0 and $R^4$ is —H.

10. The method of claim 1, wherein the dissolvable diverter is selected from the group consisting of phthalic anhydride, terephthalic anhydride, phthalic acid, terephthalic acid, gilsonite, rock salt, benzoic acid flakes, polylactic acid and mixtures thereof.

11. The method of claim 1, wherein the subterranean formation is sandstone or carbonate.

12. The method of claim 1, wherein the fluid pumped in step (a) further is foamed with a liquid hydrocarbon or a gas.

13. The method of claim 1, wherein the subterranean formation, prior to step (a), has been subjected to a fracturing operation and wherein fractures are initiated or enhanced in step (a) in a re-fracturing operation.

14. A method of stimulating the production of hydrocarbons from a subterranean formation penetrated by a wellbore, the method comprising:

(a) pumping a first fluid comprising acid, dissolvable diverter and proppant into the wellbore, wherein the dissolvable diverter is selected from at least one compound of the formula:

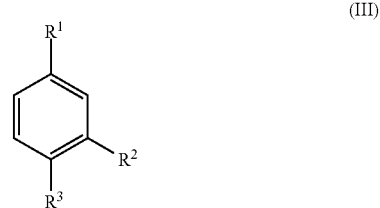

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ and $R^3$ are —COO—$(R^5O)_y$—$R^4$ when $R^1$ is —H and
further provided only one of $R^2$ or $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5;
(b) creating a flow space in the subterranean formation by reaction of the acid;
(c) forming an impermeable or low permeability filter cake of the diverter on the face of the subterranean formation while propping open at least a portion of a high permeability zone with the proppant of the mixture;
(d) pumping a second fluid containing proppant and dissolvable diverter into the subterranean formation and into a lower permeability zone of the formation farther from the wellbore, wherein the proppant, dissolvable diverter or both proppant and dissolvable diverter of the second fluid may be the same or different from the dissolvable diverter and proppant of step (a);
(e) increasing flow resistance by a pressure drop through the filter cake and diverting the second fluid to a less permeable zone with the subterranean formation; and
(f) producing hydrocarbons from the high permeability zone and the lower permeability zone while the proppant of the mixture of the first fluid remains in the high permeability zone.

15. The method of claim 14, wherein the subterranean formation is stimulated at a downhole temperature between from about 80° F. to about 400° F.

16. The method of claim 14, wherein the subterranean formation is penetrated by a horizontal well.

17. The method of claim 14, wherein the dissolvable diverter of step (a) is phthalic anhydride, terephthalic anhydride, phthalic acid, terephthalic acid or a mixture thereof.

18. The method of claim 14, wherein the fluid pumped in step (a) further comprises a corrosion inhibitor.

19. A method of stimulating the production of hydrocarbons from a subterranean formation penetrated by a wellbore, the method comprising:

(a) pumping into the wellbore and into a high permeability zone of a fracture within a subterranean formation near the wellbore a first fluid containing a mixture comprising a dissolvable diverter and a proppant, wherein the dissolvable diverter comprises a mixture of:

(i) at least one compound of the formula:

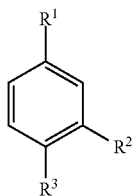

(III)

or an anhydride thereof,
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ and $R^3$ are —COO—$(R^5O)_y$—$R^4$ when $R^1$ is —H and
further provided only one of $R^2$ or $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5; and
(ii) an aliphatic polyester having the general formula of repeating units:

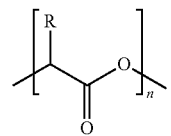

where n is an integer between 75 and 10,000 and R is selected from the group consisting of hydrogen, alkyl, aryl, alkylaryl, acetyl and heteroatoms; and
further wherein the aliphatic polyester has a particle size distribution in the range from about 0.1 micron to about 1.0 millimeter and the weight ratio of the diverter of (III) and the aliphatic polyester is from about 5:95 to about 95:5

(b) propping open at least a portion of the high permeability zone with the proppant of the mixture of the first fluid and blocking at least a portion of the high permeability zone with the diverter;
(c) pumping a second fluid into the subterranean formation and into a lower permeability zone of the formation farther from the wellbore;
(d) dissolving the diverter pumped into the wellbore in the first fluid and blocking at least a portion of the high permeability zone near the wellbore; and
(e) producing hydrocarbons from the high permeability zone and the lower permeability zone while the proppant of the mixture of the first fluid remains in the high permeability zone.

20. The method of claim 19, wherein the first fluid of step (a) is further foamed with a gas.

* * * * *